United States Patent
Cherian et al.

(10) Patent No.: US 11,809,988 B2
(45) Date of Patent: Nov. 7, 2023

(54) ARTIFICIAL INTELLIGENCE SYSTEM FOR CLASSIFICATION OF DATA BASED ON CONTRASTIVE LEARNING

(71) Applicant: Mitsubishi Electric Research Laboratories, Inc., Cambridge, MA (US)

(72) Inventors: Anoop Cherian, Belmont, MA (US); Aeron Shuchin, Medford, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 282 days.

(21) Appl. No.: 16/907,387

(22) Filed: Jun. 22, 2020

(65) Prior Publication Data

US 2021/0397970 A1    Dec. 23, 2021

(51) Int. Cl.
*G06N 3/08* (2023.01)
*G06N 3/088* (2023.01)
*G06F 17/18* (2006.01)
*G06F 18/21* (2023.01)
*G06F 18/24* (2023.01)
*G06N 3/045* (2023.01)

(52) U.S. Cl.
CPC .............. *G06N 3/08* (2013.01); *G06F 17/18* (2013.01); *G06F 18/21* (2023.01); *G06F 18/24* (2023.01); *G06N 3/045* (2023.01); *G06N 3/088* (2013.01)

(58) Field of Classification Search
CPC ........ G06N 3/08; G06N 3/0454; G06V 10/40; G06F 17/18; G06K 9/6217; G06K 9/6267
See application file for complete search history.

(56) References Cited

U.S. PATENT DOCUMENTS

| | | | | |
|---|---|---|---|---|
| 10,832,046 | B1* | 11/2020 | Al-Gharaibeh | G06F 40/40 |
| 2007/0140352 | A1* | 6/2007 | Bhaskaran | H04N 19/147 |
| | | | | 375/E7.161 |
| 2016/0048837 | A1* | 2/2016 | Jin | G06Q 20/4014 |
| | | | | 705/76 |

(Continued)

OTHER PUBLICATIONS

Sun et al., "Learning Video Representations Using Contrastive Bidirectional Transformer." arXiv:1906.05743v2 [cs.LG] Sep. 27, 2019.

(Continued)

*Primary Examiner* — Scott C Anderson
(74) *Attorney, Agent, or Firm* — Gennadiy Vinokur; Hironori Tsukamoto; LABORATORIES

(57) ABSTRACT

An artificial intelligence (AI) system that includes a processor configured to execute modules of the AI system. The modules comprise a feature extractor, an adversarial noise generator, a compressor and a classifier. The feature extractor is trained to process input data to extract features of the input data for classification of the input data. The adversarial noise generator is trained to generate noise data for distribution of features of the input data such that a misclassification rate of corrupted features that include the extracted features corrupted with the generated noise data is greater than a misclassification rate of the extracted features. The compressor is configured to compress the extracted features. The compressed features are closer to the extracted features than to the corrupted features. The classifier is trained to classify the compressed features.

20 Claims, 13 Drawing Sheets

(56) References Cited

U.S. PATENT DOCUMENTS

| | | | |
|---|---|---|---|
| 2017/0124711 A1 | 5/2017 | Chandraker et al. | |
| 2018/0288586 A1* | 10/2018 | Tran | A63B 69/38 |
| 2019/0019282 A1* | 1/2019 | Atzmon | G06V 10/507 |
| 2020/0213728 A1* | 7/2020 | Lopatka | G10L 25/51 |
| 2020/0311558 A1* | 10/2020 | Tan | G06N 3/088 |
| 2021/0350503 A1* | 11/2021 | Hobson | G06T 3/4046 |

OTHER PUBLICATIONS

Wang et al., "Contrastive Video Representation Learning via Adversarial Perturbations." This is a revised version of the ECCV 2018 conference paper titled "Learning Discriminative Video Representations Using Adversarial Perturbations." https://arxiv.org/abs/1807.09380v3.

Tramer et al., "Ensemble Adversarial Training: Attacks and Defenses." Published as a conference paper at ICLR 2018. arXiv:1705.07204v5 [stat.ML] Apr. 26, 2020.

Li et al., "AdversarialPerturbationsAgainstReal-TimeVideo ClassificationSystems." arXiv:1807.00458v1 [cs.LG] Jul. 2, 2018.

* cited by examiner

ARTIFICIAL INTELLIGENCE SYSTEM FOR CLASSIFICATION OF DATA BASED ON CONTRASTIVE LEARNING

TECHNICAL FIELD

The present disclosure generally relates to artificial intelligence (AI), and more specifically to an AI system for classification of data based on contrastive learning.

BACKGROUND

In the field of machine learning, various models (e.g., classification models) are used to perform different functions such as object classification, object detection, gesture detection, and the like by analyzing input data. In some cases, these models may generate wrong outputs due to malicious input data. This causes the classification models to misclassify input data. For instance, a small and imperceptible optimized perturbation added to an image data can cause misclassification by the classification models trained to classify images.

In general, machine learning techniques are designed for stationary and benign environments in which training and test data are assumed to be generated from same statistical distribution. However, when these models are implemented in real world applications, presence of the perturbations in the input data may violate statistical assumptions. This shows that input data can be manipulated to exploit specific vulnerabilities of learning algorithms and compromise security of a machine learning system. For example, with the knowledge of an internal architecture of the AI system that performs classification of the input data using a neural network, an adversarial input may be developed to manipulate the AI system and produce illegitimate output. Various machine learning techniques utilize such adversarial input by a contrastive learning approach. The contrastive learning approach provides a learning model for learning distinctiveness between similar or different features of the input data. For example, in contrastive learning, generic representations of input data (such as input images) on an unlabeled dataset is learned and then is fine-tuned with a small dataset of labeled images for a given classification task, where the representations include adversarial inputs. The representations are learned by simultaneously maximizing agreement between different versions or views of the same image and cutting down the difference using contrastive learning. When the parameters of a neural network are updated using this contrastive objective causes representations of corresponding views to "attract" each other, while representations of non-corresponding views "repel" each other. However, the development of the adversarial input for the misclassification by the classification models may be unknown and uncontrolled. In some cases, the classification models may miss to learn useful information in the adversarial inputs.

Accordingly, there is a need of a system to accurately classify input data based on the contrastive learning.

SUMMARY

It is an object of some embodiment to employ adversarial machine learning for data compression tasks. It is another object of some embodiments to perform classification of data compressed with adversarial machine learning, contrastive learning and/or combination thereof.

Specifically, some embodiments are based on the recognition that data analyzed from classification point of view may include information that are useful for classification as well as information that are not useful for the classification. For example, if a classifier is trained to classify input data, such as image data. The image data may include image of a dog or a cat. The classifier uses a few features from the image data to classify the image data. However, the classifier may not use other features of the image data for the classification. The features that are used by the classifier are referred herein as useful features, while those features are not used in the classification are referred as useless features.

Some embodiments are based on the understanding that features extracted from the input data may be compressed. The extracted features are compressed to include the useful features without sacrificing accuracy of the classification. In some example embodiments, the features may be extracted by a pre-trained neural network for the classification. However, the neural network may not able to identify the useful features and the useless features in the extracted features. To this end, some embodiments are based on the realization that principles of adversarial machine learning and contrastive learning may be used to identify the useful features and the useless features in the extracted features. Specifically, the adversarial machine learning may be used to determine the useless features.

Some embodiments are based on the realization that the adversarial machine learning is used to corrupt the extracted features. The extracted features are corrupted such that the classifier misclassifies the extracted features. For example, the extracted features are from an image including a dog. The classifier may classify the extracted features belonging to the image including the dog. When the corrupted features are provided to the classifier, the classifier may misclassify the extracted features to an image different from the image that includes the dog. The objective of the adversarial machine learning is to corrupt the features such that the same classifier misclassifies the features. For instance, the classifier misclassifies the features of the image of the dog to an image of a cat.

To achieve such an objective, the adversarial machine learning may corrupt a part of the extracted features used for the classification. To that end, the useful features in the extracted features may be corrupted based on the adversarial machine learning. The useless features in the extracted features may not be corrupted as it may be disadvantageous to preserve the integrity of the corrupted features. Hence, in the corrupted features, the useful features are modified, while the useless features may be preserved.

The useful features may be present in original extracted features, while useless data may be present in both the original extracted features as well as the corrupted features. Based on this understanding, in some embodiments, the extracted features are compressed such that the compressed features are close to original features of the input data and the corrupted features are distant from the extracted features.

In some embodiments, the compressed features may be determined by solving a multi-objective optimization. The multi-objective optimization optimizes a cost function. The cost function reduces a distance between the compressed features and the extracted features. The cost function also increases a distance between the compressed features and the corrupted features.

In some embodiments, the extracted features are corrupted using noise data generated by an adversarial noise generator. The adversarial noise generator may be trained based on a Generative Adversarial Network (GAN). The GAN includes a generator and a discriminator. The adversarial noise generator generates the noise data from statistical distribution of the extracted features. The generated noise data provides the classifier with a success rate of classification of the corrupted features that is less than a success rate of classification of the extracted features. The distribution of the corrupted features is tested by the discriminator. To that end, in some embodiments, the generator may replicate the extracted features and generate corrupted features for each replicated feature of the extracted features. The corrupted features are generated by combining the noise data with each replicated feature.

In an example embodiment, distribution of the noise data may be uncorrelated to the input data. Accordingly, it is an objective of the present disclosure that the distribution of corrupted features that include the extracted features with the noise data is closer to the distribution of the extracted features. To that end, the compression of the extracted features may be trained to minimize a loss function including a combination of failures of the generated distribution of the extracted features and failures of the classification of input data.

In some embodiments, the compressed features may be projected into a subspace for generating a subspace representation of a sequence of temporally connected data of the input data. To that end, the sequence of temporally connected data may be derived from a temporal order of the input data. In some example embodiments, the temporal order may be obtained using an order-constrained Principal Component Analysis (PCA) technique. In some cases, the subspace representation may diverge from the input data. To that end, a distortion penalty may be applied to the subspace representation to prevent from diverging from the input data.

Accordingly, one embodiment discloses an artificial intelligence (AI) system for classification of data compressed with adversarial machine learning. The AI system includes a processor configured to execute modules of the AI system. The modules comprises a feature extractor, an adversarial noise generator, a compressor and a classifier. The feature extractor is trained to process input data to extract features of the input data for classification of the input data. The adversarial noise generator is trained to generate noise data for distribution of features of the input data. The noise data are generated in such a way that corrupted features that include the extracted features corrupted with the generated noise data have a misclassification rate that is greater than a misclassification rate of the extracted features. The compressor is configured to compress the extracted features. The compressed features are closer to the extracted features than to the corrupted features. The classifier is trained to classify the compressed features.

Another embodiment discloses a computer-implemented method for classification of data compressed with adversarial machine learning. The method includes extracting features of input data for classification of the input data. The method includes generating noise data for a distribution of features of the input data such that a misclassification rate of corrupted features that include the extracted features corrupted with the generated noise data is greater than the misclassification rate of the extracted features. The method includes compressing the extracted features such that the compressed features are closer to the extracted features than to the corrupted features. The method further includes classifying the compressed features.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Overview

The proposed Artificial Intelligence (AI) system enables learning of a representation for compressing features of an input data. The representation may be a low-dimensional subspace representation respecting the sequential/temporal order of input data. It is an objective of the AI system to capture implicit informative cues, such as spatio-temporal information of input data for learning the representation. The spatio-temporal information of the input data may be captured through extraction of features from the input data for classification of the input data. To that end, the feature extraction may be maximized for such information cues from the input data. In some embodiments, the feature extraction may be maximized using contrastive representation learning.

Figure 1A:
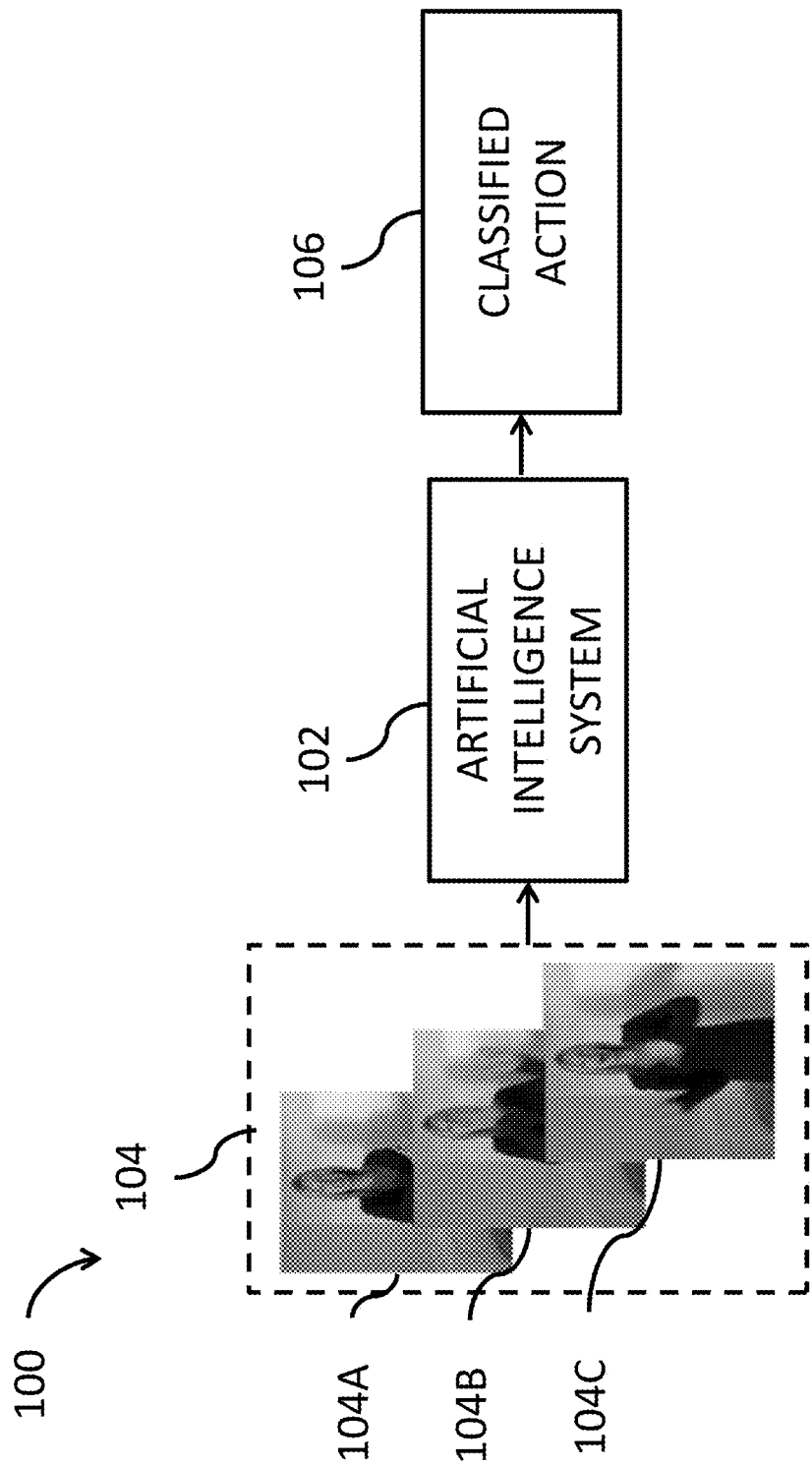
FIG. 1A shows a schematic diagram depicting classification of input data using an Artificial Intelligence (AI) system, according to some embodiments of the present disclosure.

FIG. 1A shows a schematic diagram 100 depicting classification of input data 104 using an Artificial Intelligence (AI) system 102, according to some embodiments of the present disclosure. In an example embodiment, the input data 104 may include a sequence of frames 104A, 104B and 104C of a video. The sequence of frames 104A, 104B and 104C may be associated with a temporal sequence. The input data 104 is provided to the AI system 102 for classification of the input data 104. In an illustrative example scenario, the sequence of frames 104A, 104B, and 104C may include a human action. The AI system 102 identifies the human action that may be provided as a classified action 106. As shown in FIG. 1A, the human action includes clapping action in the sequence of frames 104A, 104B, and 104C. Thus, the classified action 106 may be identified as the clapping action. In some cases, the classified action 106 may be identified from one of the sequence of frames. However, classification of the human action based on one frame of the input data 104 may jeopardize the classification. In some other cases, using each of the sequence of frames 104A, 104B, and 104C for the classification may not be feasible and efficient, due to limited memory and processing resources.

Figure 1B:
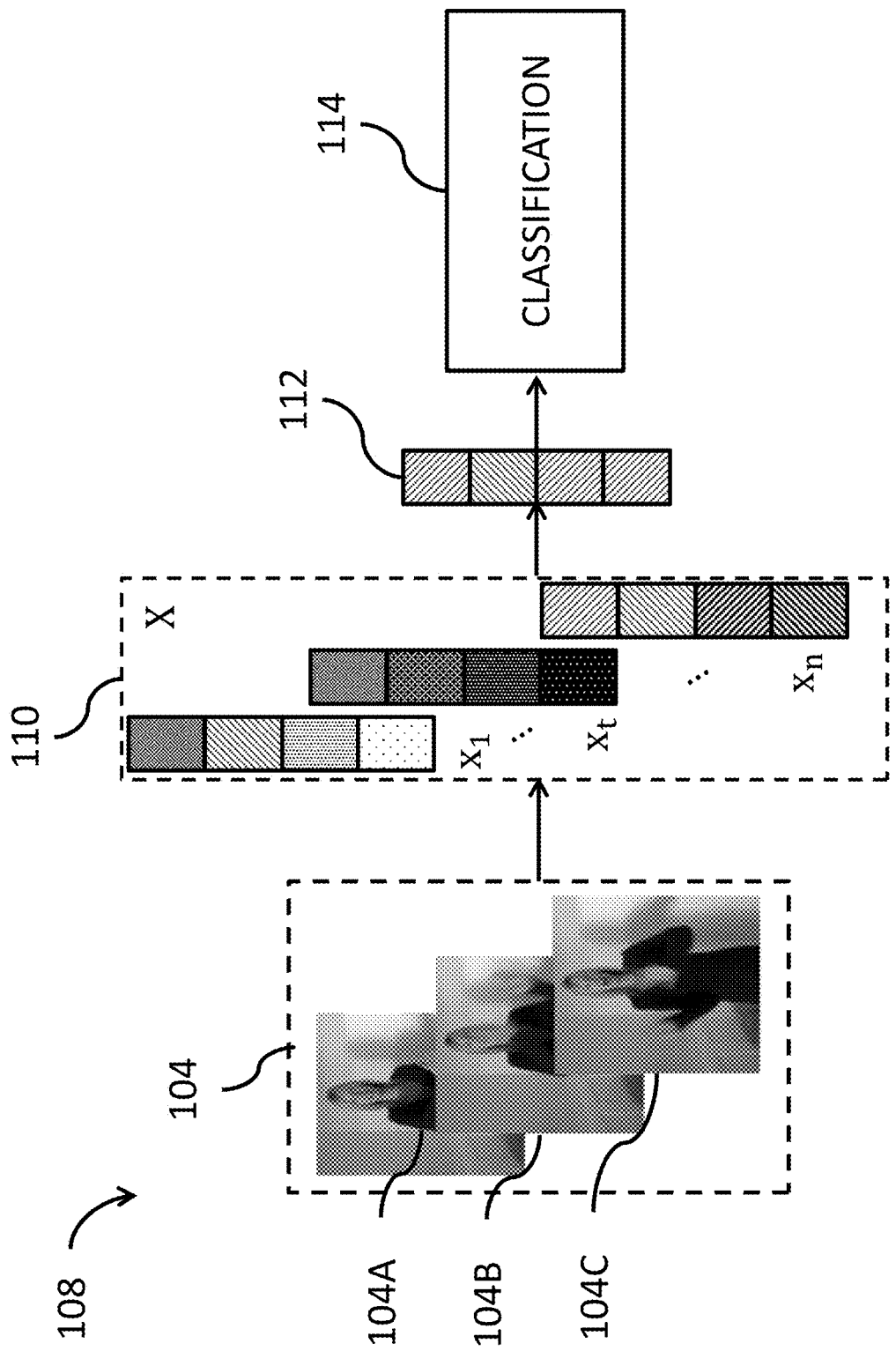
FIG. 1B shows a representation depicting extraction of compressed features from the input data for the classification, according to some embodiments of the present disclosure.

To that end, some embodiments are based on the realization, that in some cases, the input data 104 provided for the classification may be compressed, which is shown in FIG. 1B.

FIG. 1B shows a schematic diagram 108 depicting extraction of compressed features from the input data for the classification, according to some embodiments of the present disclosure. To that end, the input data 104 may be compressed such that data complexity is reduced, while maintaining accuracy of subsequent classification. For instance, the AI system 102 extracts features 110 ($X=x_1, x_t, x_n$) from each of the sequence of frames 104. The AI system 102 compresses the extracted features 110 into compressed features 112. The compressed features 112 undergo a classification 114 for providing the classified action 106, with less data complexity.

The compressed features 112 enable a classifier to learn similarity and difference between the extracted features and other features, such as corrupted features of the input data 104. Such learning implies a contrastive learning, which is explained next with reference to FIG. 1C.

Figure 1C:
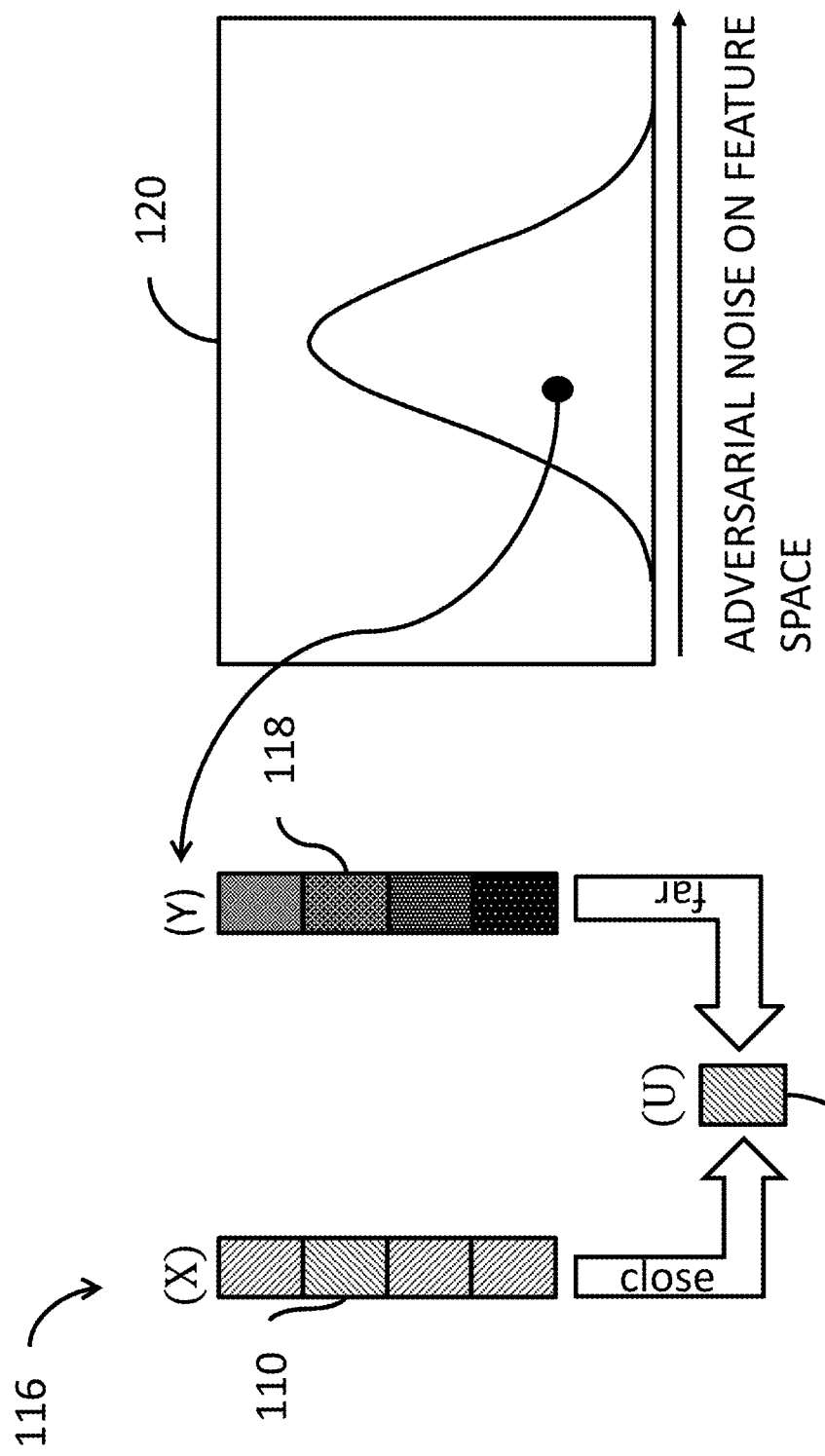
FIG. 1C shows a contrastive learning representation of the compressed features, according to some embodiments of the present disclosure.

FIG. 1C shows a contrastive learning representation 116 of the compressed features, according to some embodiments of the present disclosure. The extracted features 110 (X) are represented using the compressed features 112 that are far from being similar to other features, such as corrupted features 118 (Y). Such representation implies that the compressed features 112 (U) may push away information in the extracted features 110 (X) that is not present in the corrupted features 118 (Y). The compressed features 112 (U) are contrasting to the corrupted features 118 (Y), which represents the contrastive learning of features for the classification of the input data 104.

To that end, it is an objective of the present disclosure to generate compressed features that are far from the corrupted features 118 (Y). The corrupted features 118 (Y) may be generated based on noise data, such as adversarial noise data lying within feature space, as shown in a graphical plot 120 of FIG. 1C. For each of the extracted features 110 (X), adversarial noise data for distribution of the extracted features 110 (X). The corrupted features 118 (Y) include the extracted features 110 (X) and the noise data such that the corrupted features 118 (Y) are similar to the extracted features 110 (X). However, when the corrupted features 118 (Y) are provided as input to a classifier, the classifier misclassifies the corrupted features 118 (Y).

In some embodiments, the corrupted features 118 (Y) are generated by the AI system 102, which is further described in description of subsequent figures in the present disclosure. In some embodiments, the AI system 102 may comprise modules for the classification of the input data 104, which is explained next with reference to FIG. 2A.

Figure 2A:
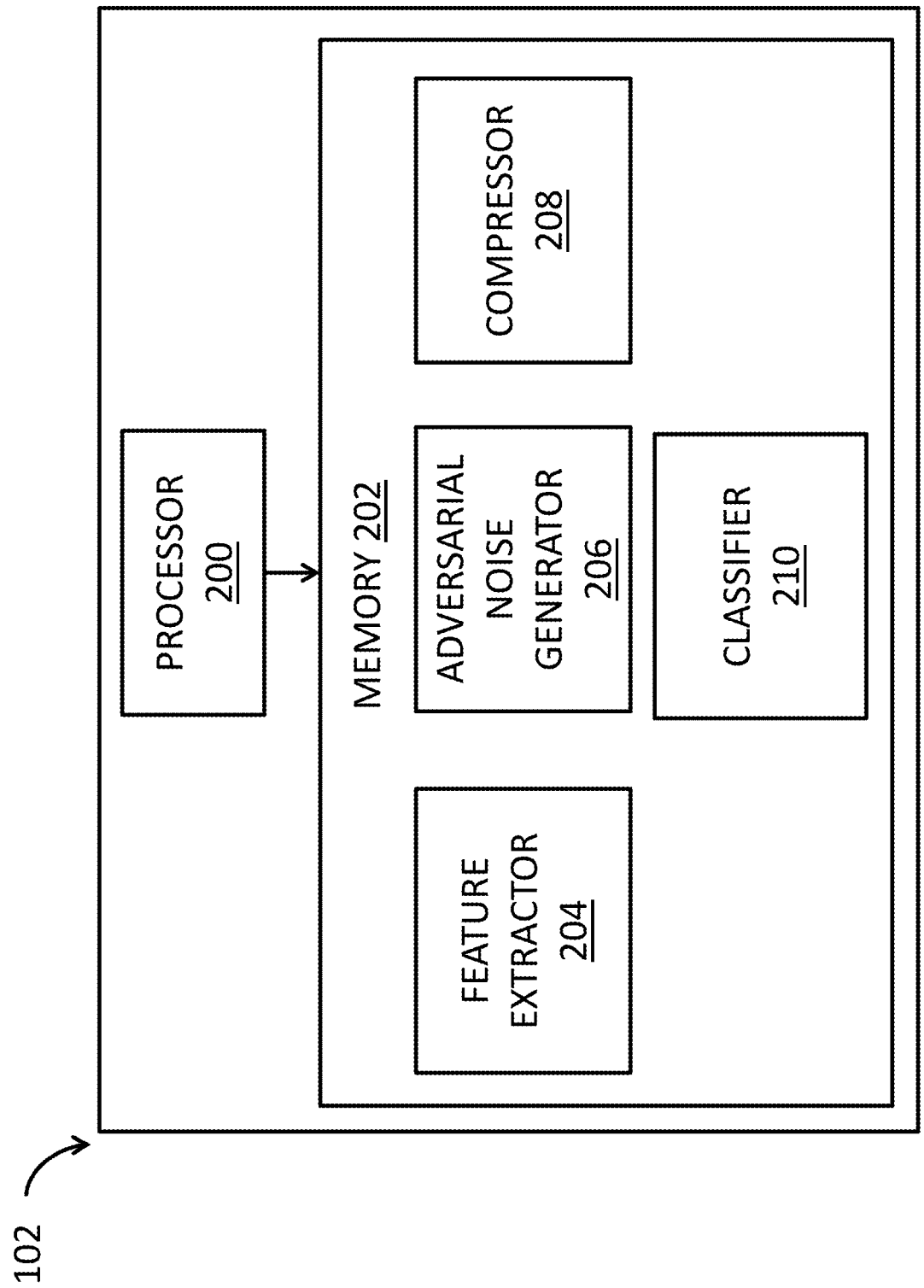
FIG. 2A shows a schematic diagram depicting modules of the AI system, according to some example embodiments of the present disclosure.

FIG. 2A shows a schematic diagram depicting modules of the AI system 102, according to some embodiments of the present disclosure. The AI system 102 comprises a processor 200 that is configured to execute modules of the AI system 102 stored in a memory 202. The modules may include a feature extractor 204, an adversarial noise generator 206, a compressor 208 and a classifier 210. The feature extractor 204 may be trained to process the input data 104 to extract features of the input data 104 for the classification of objects included in the input data 104. The adversarial noise generator 206 is trained to generate noise data for distribution of corrupted features of the input data 104. The extracted features are corrupted by the generated noise data to provide corrupted features. When the corrupted features and the extracted features undergo a classification, the corrupted features have a misclassification rate greater than a misclassification rate of the extracted features. In some example embodiments, the noise data may correspond to Gaussian noise. Further, the compressor 208 is configured to compress the extracted features. The compressed features are closer to the extracted features than to the corrupted features. The classifier 210 is configured to classify the compressed features.

The generation of the noise data by the adversarial noise generator 206 is further explained next with reference to FIG. 2B.

Figure 2B:
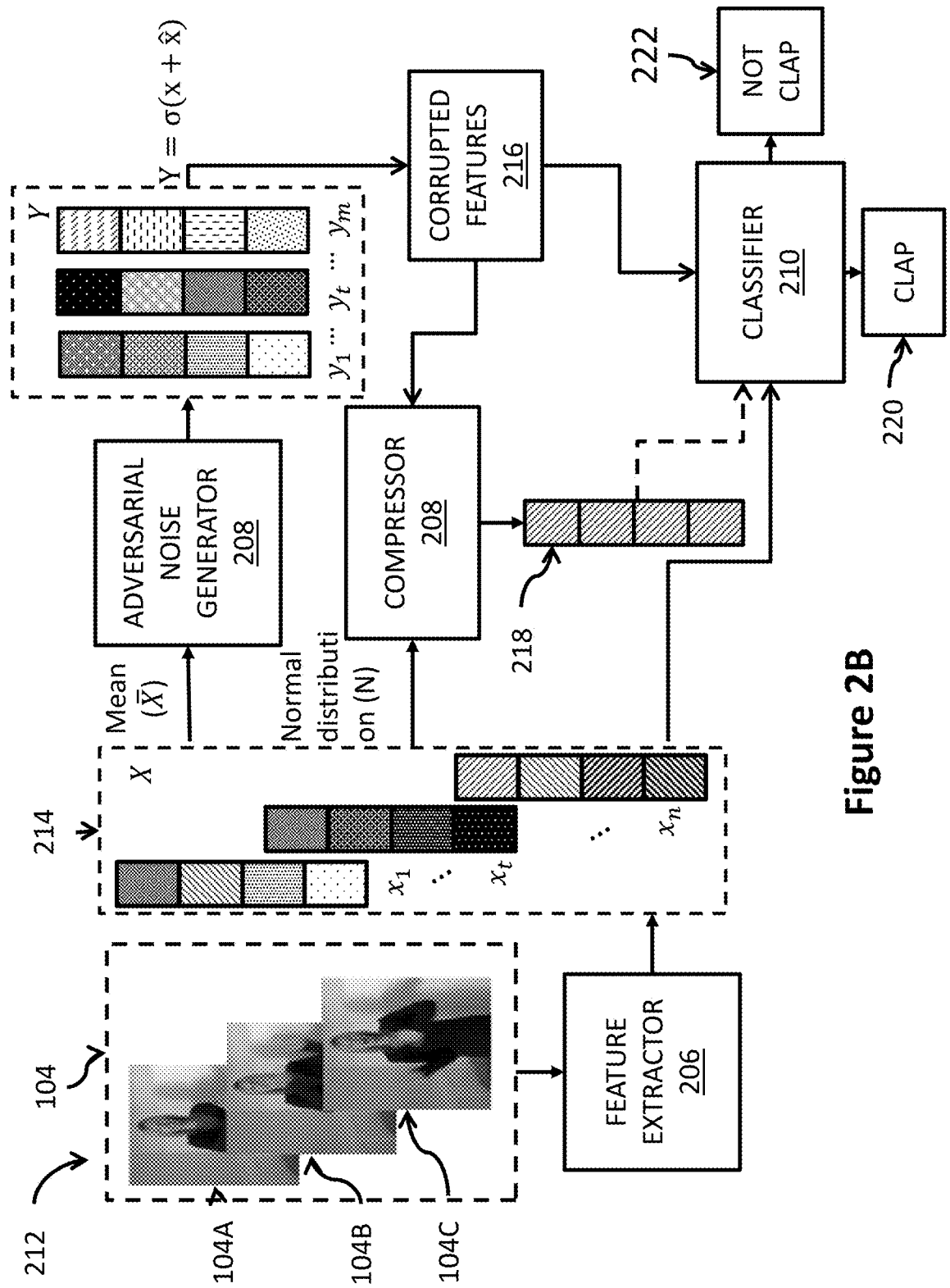
FIG. 2B shows a schematic diagram depicting generation of noise data for the classification of the input data, according to some embodiments of the present disclosure.

FIG. 2B shows a schematic diagram 212 depicting generation of the noise data for the classification of the input data 104 by the AI system 102, according to some embodiments of the present disclosure. The sequence of frames 104A, 104B, and 104C is provided to the feature extractor 204. The feature extractor 204 processes the sequence of frames 104A, 104B, and 104C to extract features 214 (e.g., the extracted features 110 (X)) for the classification. In some example embodiments, the feature extractor 204 may encode the sequence of frames 104A, 104B, 104C into a set of features vectors such as (X=$x_1$, $x_t$, ..., $x_n$). The sequence of frames 104A, 104B, and 104C may be encoded using a pre-trained neural network. Additionally, or alternatively, the feature extractor 204 may maximize extraction of the features 214 for capturing informative cues, such as spatio-temporal cues of the sequence of frames 104A, 104B, and 104C.

To that end, the processor 200 may determine a value of a mean of the extracted features 214($\overline{X}$) and/or a normal distribution of the extracted features 214 (N($\overline{X}$, $\sigma^2$I) or $\mu_x$) around the mean. Further, the mean and the normal distribution of the extracted features 214 are provided to the adversarial noise generator 206. The adversarial noise generator 206 is trained to generate noise data (z) for a distribution of features 214. In an example embodiment, the adversarial noise generator 206 generates distribution of corrupted features 216 ($v_y$) closer to the distribution of the extracted features 214 ($\mu_x$). The corrupted features 216 (e.g., the corrupted features 118 (Y)) include the extracted features 214 that are corrupted with the generated noise data (z). The corrupted features 216 may be represented by (Y=$y_1$, $y_t$, ..., $y_n$). These generated noise data may not impact useful features of the extracted features 214 (X).

The distribution of the corrupted features 216 may correspond to the normal distribution of the extracted features 214. In some example embodiments, the corrupted features 216 may comprise a set of adversarial noise samples, such as y=σ(x+x̂). The corrupted features 216 may be defined via an implicit function of the adversarial noise generator 208, i.e., y=$g_\theta$(z), where θ defines parameters to be learned and the distribution of the noise data z~N($\overline{X}$, $\sigma^2$I). The mean $\overline{X}$ of the extracted features 214 defines average of the extracted features 214 in respective sequence, i.e.

$$\overline{X} = \frac{1}{n}\Sigma_t x_t.$$

When the corrupted features 216 are provided to the classifier 210, a misclassification rate of the corrupted features 216 is greater than a misclassification rate of the extracted features 214.

In some embodiments, the classifier 210 may be associated with a ground truth class label that includes a set of labels for different actions. For instance, the classifier 210 may classify the extracted features 214 as "clap" action 220, based on the set of labels. In some example embodiments, the classifier 210 may misclassify the corrupted features 216 as the noise data (z) in the corrupted features 216 and may not include informative cues for the classification. This indicates the corrupted features 216 are different and distant from the extracted features 214. For instance, the classifier 210 may classify the corrupted features 216 as "not clap" action 222.

Further, the extracted features 214 are compressed by the compressor 208 to generate compressed features 220. In an example embodiment, the compressed features 220 may represent a summarized representation from the extracted features 214. The extracted features 214 may be of an arbitrary length as length of the input data 104 may be arbitrary. However, length of the summarized representation may be of fixed length. For instance, the extracted features 214 may have 1000 elements each and have a length of 100 vectors. These 100 vectors may be compressed to 10 vectors, each with 1000 elements. Thus, the compressor 208 may generate a summarized representation of 10 vectors each with 1000 elements from the 100 vectors of the extracted features 214, each with 1000 elements.

In some embodiments, the compressor 210 also uses the corrupted features 216 for the compression of the extracted features 214. The compressed features 220 (e.g., the compressed features 112 (U)) may be closer to the extracted features 214 than to the corrupted features 216, i.e. the compressed features 220 are similar to the extracted features 214. The compressed features 218 are provided to the classifier 210, where the classifier 210 classifies the compressed features 218 in an efficient manner. In some embodiments, the compressed features 218 are determined based on a multi-objective optimization, which is further explained with reference to FIG. 2A.

Figure 2C:
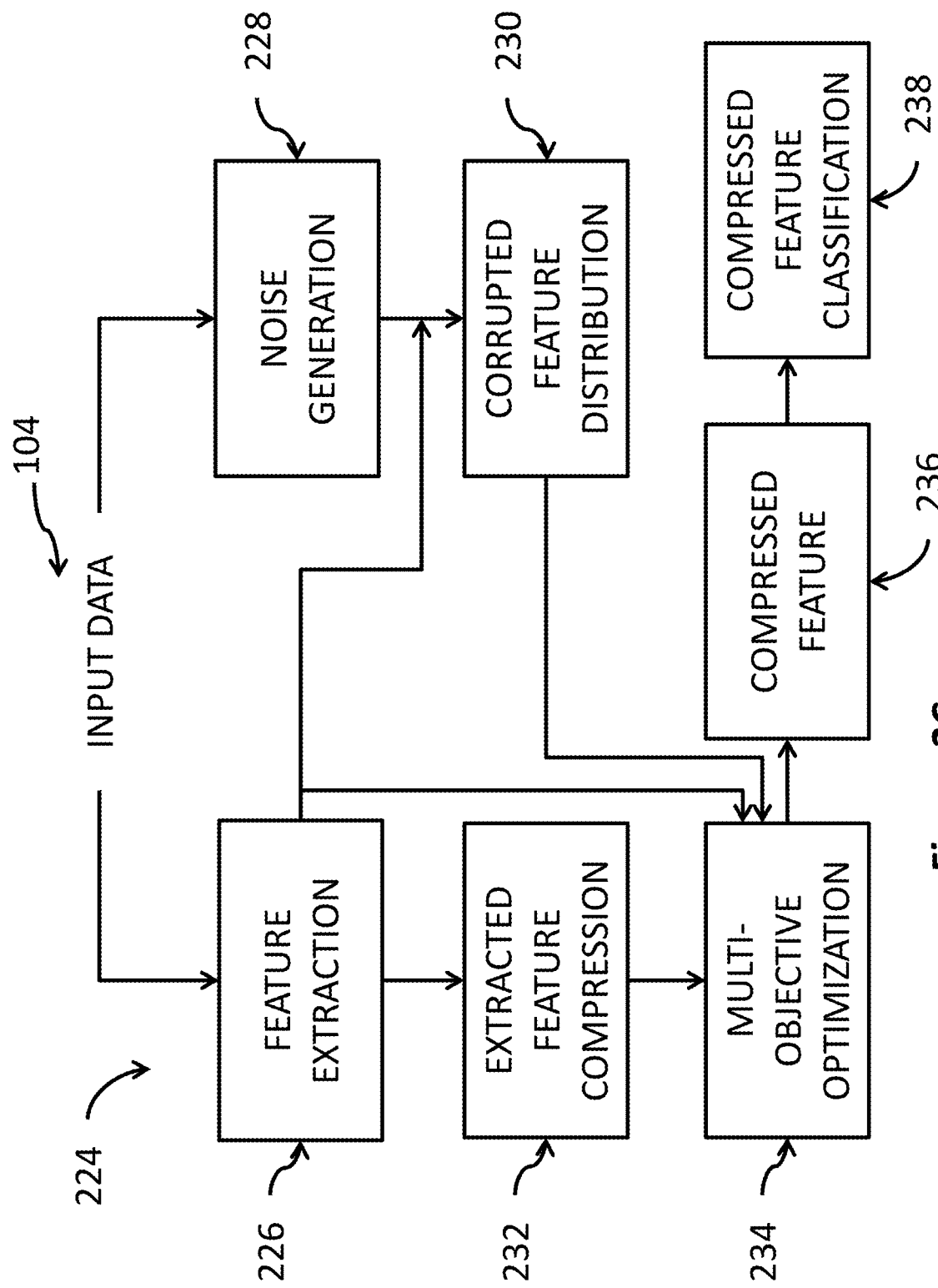
FIG. 2C shows a processing pipeline of the AI system, according to some example embodiments of the present disclosure.

FIG. 2C shows a processing pipeline 224 of the AI system 102, according to some example embodiments of the present disclosure. Initially, the input data 104 is provided to the feature extractor 204.

At step 226, feature extraction from the input data 104 is performed by the feature extractor 204. The feature extractor 204 extracts the features 214. In some example embodiments, the feature 214 may be extracted by encoding the sequence of frames 104A, 104B, and 104C into a set of features vectors, using a pre-trained neural network. The extraction of features 214 may also capture informative cues, such as spatio-temporal cues of the sequence of frames 104A, 104B, and 104C. The spatio-temporal cues may be captured based on a mean value and a normal distribution of the extracted features 214.

At step 228, the noise data (z) is generated from the input data 104 by the adversarial noise generator 206. The adversarial noise generator 206 also receives the mean and the normal distribution of the extracted features 214 for the noise data generation. The extracted features 214 are corrupted with the noise data to generate the corrupted features 216. The corrupted features 216 are distributed according to a distribution of the extracted features 214 at step 230.

At step 232, the extracted features 214 are compressed by the compressor 208 to generate the compressed features 218. In some embodiments, the compressor 208 is configured to determine the compressed features 218 by solving a multi-objective optimization. At step 234, the compressor 208 solves the multi-objective optimization that optimizes a cost function. The cost function reduces a distance between the compressed features 218 and the extracted features 214. In the cost function optimization, the compressed features 218 are coupled with the extracted features 214. The cost function also increases a distance between the compressed features 218 and the corrupted features 216.

In an example embodiment, the distance between the compressed features 218 and the corrupted features 216 may correspond to the Wasserstein distance (optimal transport between two distributions). The optimal transport may be denoted by $W_c(\mu, v)$, which is a distance between probability measure of the extracted features 214 (μ) and probability measure of the corrupted features 216 (v). The probability measures μ and v are supported on $R^d$ with respect to the cost function c(x, y), where x,y∈$R^d$. The $W_c(\mu, v)$ may be represented as:

$$W_c(\mu, v) := \inf_{\pi \in \Pi(u,v)} E_{(x,y) \sim \pi} c(x, y) \quad (1)$$

Here, $\Pi(u, v)$ denotes the set of all couplings (e.g. joint probability distributions) with marginal probability measures μ and v.

For the extracted features 214, such as a set of features X, let $\mu_X$ be an empirical distribution. The empirical distribution $\mu_X$ may be equal or have a uniform probability over the extracted features 214, $x_t \in X$, i.e., $$\mu_X = \sum_{t=1}^{n} \frac{1}{n} \delta(x_t),$$

$\delta(x_t)$ denoting the measure at $x_t$. In a similar manner, empirical distribution of the corrupted features 216 may be denoted by $v_Y$. The empirical distribution $v_Y$ also has a uniform probability over the extracted features 214. In an example embodiment, best coupling between the extracted features 214 and the corrupted features 216 determined via the optimal transport.

At step 236, the compressed features 218 are generated such that the compressed features 218 are similar to the extracted features 214 and different from the corrupted features 216. At step 238, the compressed features 218 are classified by the classifier 210.

In some embodiments, the compressor 208 may be trained to minimize a loss function. The loss function includes a combination of failures of the generated noise data 120 and failures of the classification by the classifier 210. The loss function may be denoted by:

$$L_D = \frac{1}{N} \sum_{i=1}^{N} L_C(U_i, l_i)$$

and $U_i = \arg\min_U L_R(U(X_i))$. The loss function $L_D$ aggregates error $L_C$ in training the classifier 210 on the representations $U_i$ for each sequence $X_i$ against the ground truth label $l_i$. The representations ($U_i$'s) are projected in a graphical plot. Further, the $U_i$'s are obtained via optimizing a sequence level representation captured by the loss $L_R$. In a classical feature learning setup, $L_R$ finds a vector U that minimizes, such as, the mean-squared error to the input data 104 that provides an average feature. In such case, arg min optimization may correspond to an average pooling scheme. In some example embodiments, the losses $L_C$ and $L_R$ may be jointly trained in an end-to-end manner.

It is an objective of the present disclosure that the noise data is generated such that the compressed features 218 are closer to the extracted features 214 and the corrupted features 216 are distant from the extracted features 214. To that end, in some embodiments, the adversarial noise generator is trained using a Generative Adversarial Network (GAN), which is explained next with reference to FIG. 3.

Figure 3:
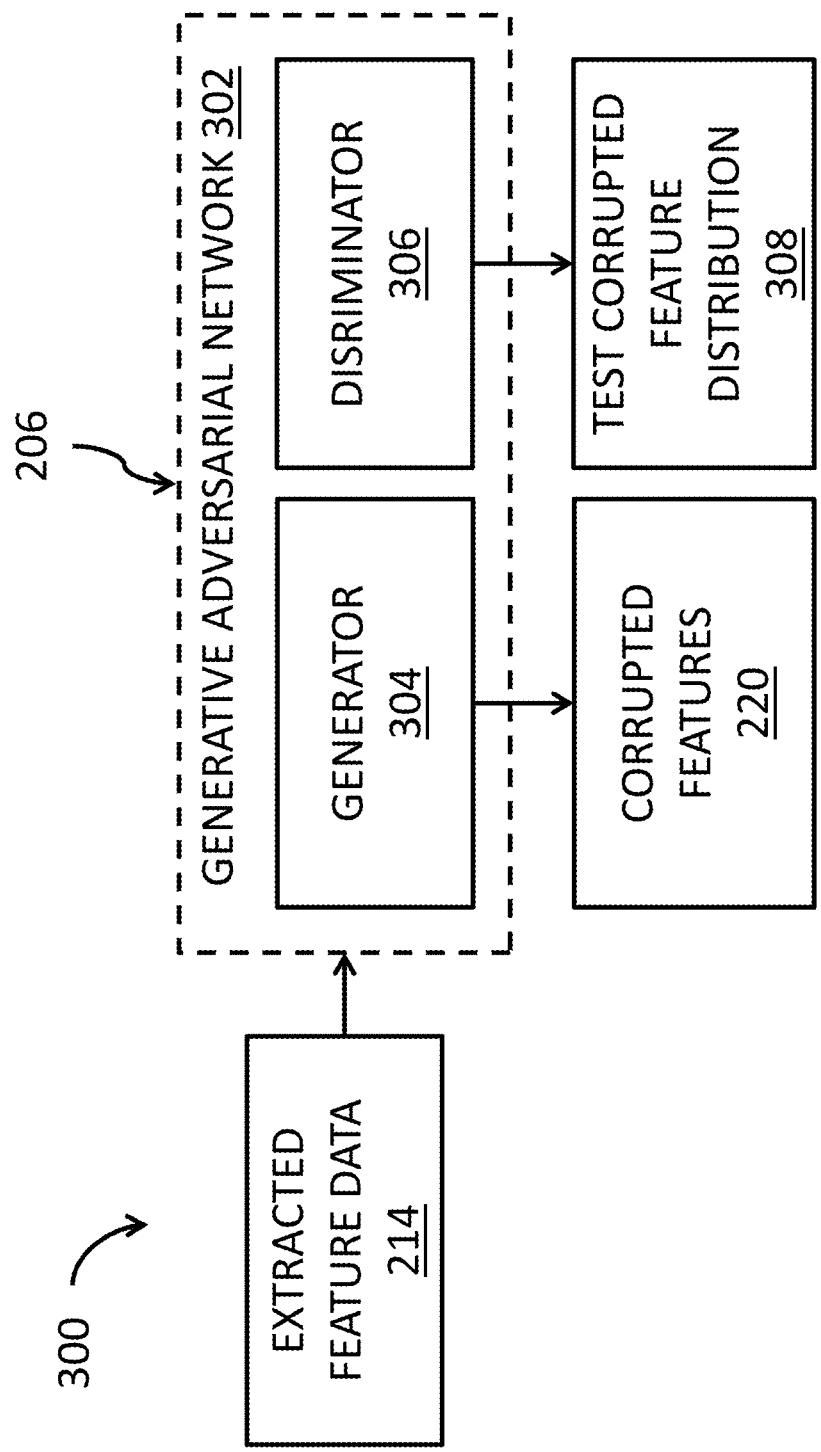
FIG. 3 shows a block diagram of an adversarial noise generator of the AI system, according to some example embodiments of the present disclosure.

FIG. 3 shows a block diagram 300 of the adversarial noise generator 206 of the AI system 102, according to some example embodiments of the present disclosure. The adversarial noise generator 206 may be trained using a Generative Adversarial Network (GAN) 302. The GAN 302 includes a generator 304 and a discriminator 306. The generator 304 receives the extracted features 214 as input and generates the noise data. The discriminator 306 tests distribution of the corrupted features 216. The discriminator 306 checks if the distribution of the generated corrupted features 216 corresponds to the statistical distribution of the extracted features 214.

In an example embodiment, the generator 304 is configured to generate the noise data from statistical distribution of the extracted features 214. The statistical distribution is derived from the normal distribution determined by the processor 200 from the extracted features 214. Additionally or alternatively, the noise data may be randomly sampled from the normal distribution, such as N(x, σ), where σ is a user-defined standard deviation.

To that end, the generator 304 may be trained to satisfy the criteria that the classifier 210 generates a label vector for the compressed features 218 with highest score for a class and generates a label vector for the corrupted features 216 with lowest score for the class that received the highest score when using the compressed features 218. Such criteria enable the generator 304 to generate adversarial noise data for any randomly sample noise data from respective distribution of the extracted features 214.

Further, the generation of the noise data based on the statistical distribution, provide a success rate of the corrupted features that is less than a success rate of classification of the extracted features 214. To that end, in some embodiments, the generator 304 may be further configured to replicate the extracted features 214 and generate corrupted features for each replicated feature of the extracted features 214 by combining the noise data with each replicated feature. To that end, each of the features vectors of the corrupted features may differ due to the noise data. The generation of different types of corrupted features may increase the chance of determining useless features to generate compressed features with the distribution of the extracted features 214.

In some example embodiments, temporal order of the input data 104 may be added to the compressed features 218, which is further explained next with reference to FIG. 4.

Figure 4:
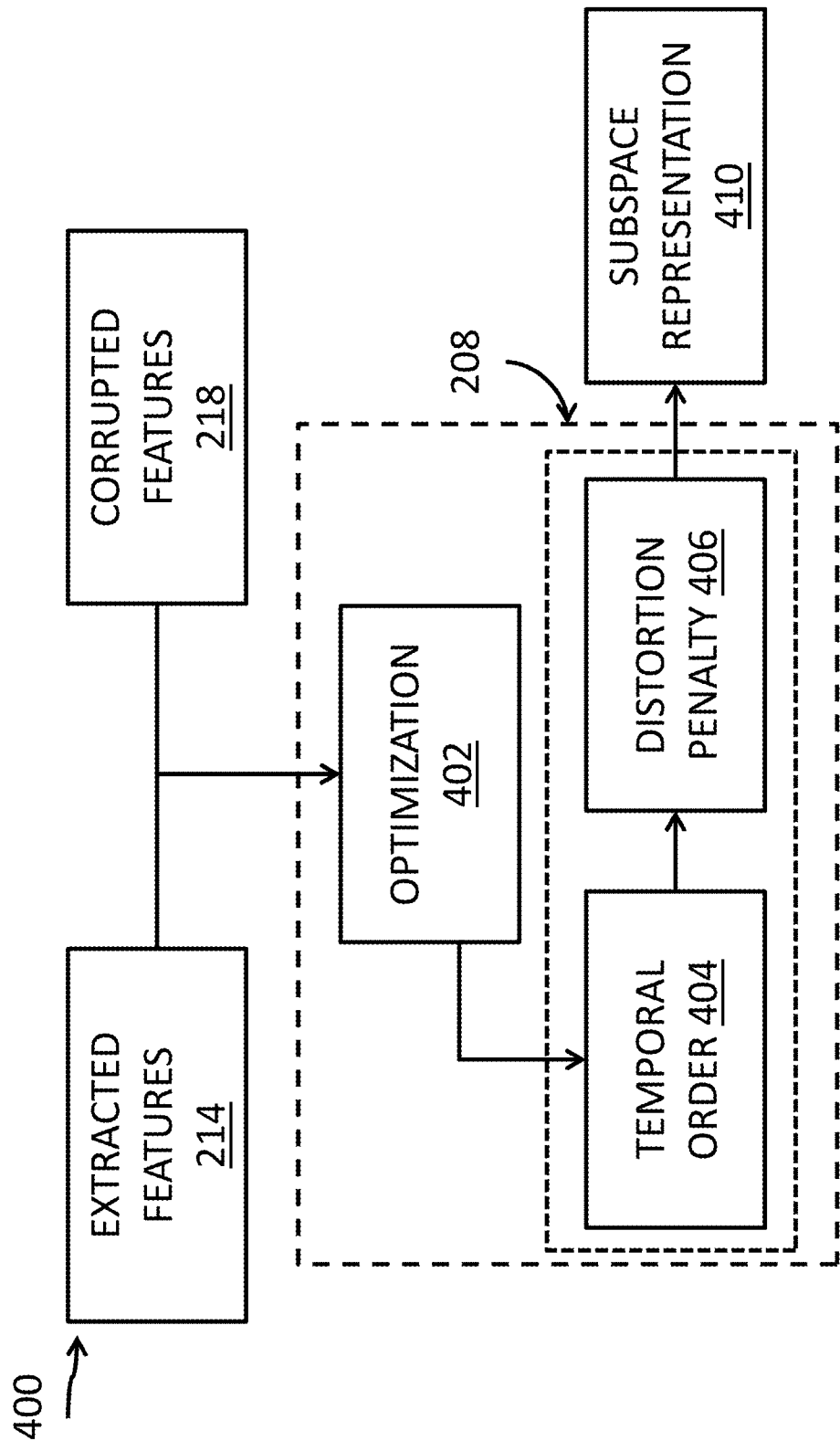
FIG. 4 shows a block diagram of a compressor of the AI system, according to some example embodiments of the present disclosure.

FIG. 4 shows a block diagram 400 of the compressor 208 of the AI system 102, according to some example embodiments of the present disclosure. The compressor 208 performs an optimization 402, such as multi-objective optimization that optimizes the cost function. In the cost function optimization, an optimal transport coupling between the extracted features 214 and the corrupted features 218 is minimized. In some embodiments, the compressor 208 is configured to learn a temporal order 404 of the input data 104. The compressor 208 generates the compressed features 218 in order of the temporal order 404. In some example embodiments, the compressed features 218 are projected into a subspace to generate a subspace representation 410. The subspace representation 410 is a learning representation with a sequence of temporally connected data of the input data 104. In an example embodiment, the sequence of temporally connected data is based on the temporal order 404 that may be captured using a Principal Component Analysis (PCA). The PCA with ordering constraints captures a sequential order of the input data 104.

The subspace representation 410 maximizes distance between projection of the extracted features 214 onto the subspace representation 410 and projection of the corrupted features 216. To that end, the subspace representation is prevented from diverging from the extracted features 214 based on a distortion penalty 406. In an example embodiment, the distortion penalty 406 may include a distortion metric determined from the extracted features 214 by the compressor 208. The distortion metric may act as a regularization preventing the subspace representation 410 from diverging from the extracted features 214. The regularization may be achieved by solving a PCA type reconstruction loss on the subspace representation 410. The subspace representation 410 may provide features for the classification that are filtered from the generated noise data.

In an example embodiment, the subspace representation 410 (U) may be formulated as:

$$\max_U \mathcal{L}_{OT}(U) := W_C(f_{U\#}\mu_X, \nu_Y) \quad (2)$$

Here, $f_U$ is a mapping denoted by $f_U: R^d \rightarrow R^d$. The $f_U$ may be parametrized for the subspace representation 410 from the compressed features 122. The mapping f may be defined as $f = UU^T$ for orthonormal $U \in R^{d \times k}$, i.e. $U^T U = I_k$ where $I_k$ denote k×k identity matrix and k≤d.

The optimal transport of (1) may be rearranged in an empirical form and combined with the mapping f in (2), for denoting the contrastive representation learning objective as:

$$\max_{U \in G(d,k)} \mathcal{L}_{OT}(U) := \inf_{\pi \in \Pi(\mu_X, \nu_Y)} \Sigma_{i,j} \pi_{ij} \|f_U(x_i) - y_j\| \quad (3)$$

In some example embodiments, $U \in G(d, k)$ may correspond to Grass-mann manifold of all k-dimensional subspaces of $R^d$. Here, G(d, k) denotes quotient space S(d, k)/O(k) of all d×k orthonormal matrices S(d, k) that are invariant to right rotations. Given that loss $L_{OT}(U) = L_{OT}(UR)$ for any k×k orthogonal matrix R, the Grass-mann manifold is selected for the subspace representation learning objective.

Figure 5:
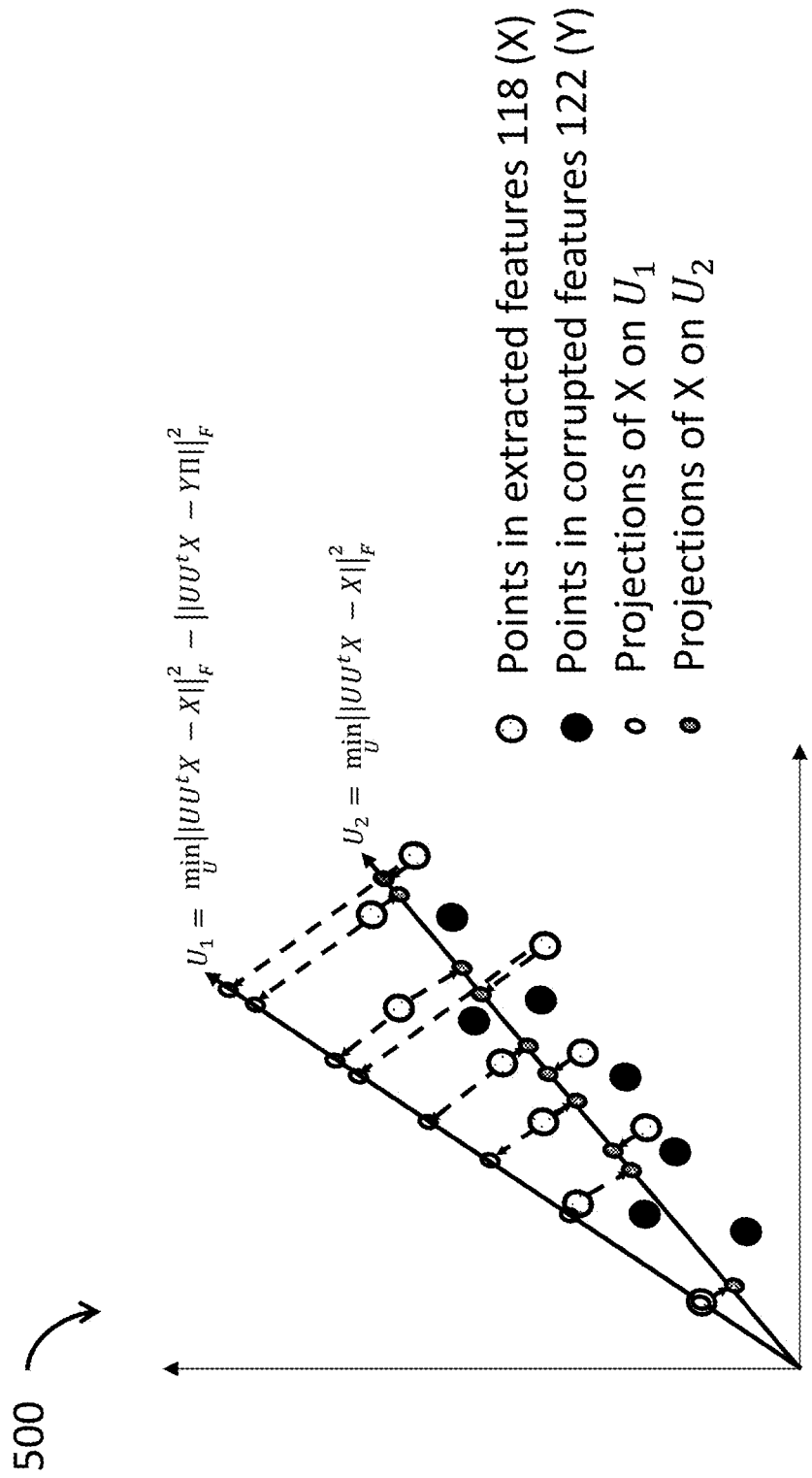
FIG. 5 shows a graphical plot depicting projection of extracted features on compressed features, according to some example embodiments of the present disclosure.

The projections of the extracted features 214 and the corrupted features 216 are shown in FIG. 5.

FIG. 5 shows a graphical plot 500 depicting projection of extracted features 214 and projection of the corrupted features 216, according to some example embodiments of the present disclosure. In an example embodiment, the sequence of frames 104A, 104B, and 104C may be represented as a set of N data sequences $D = \{X_1, X_2, \ldots, X_N\}$, where each $X_i = \langle x_1^i, x_2^i, \ldots, x_{n_i}^i \rangle$ is a sequence of $n_i$ ordered feature vectors and each $x_i \in R^d$. Further, $X_i$ is assumed to be associated with a ground truth class label $l_i \in L$, where L denotes a given set of labels. Also, each x∈X is an independent sample from a data distribution $P_D(\overline{X})$ conditioned on the mean of the input data 104, i.e. $\overline{X}$ of the sequence X.

The graphical plot 500 depicts direction $U_1$ of the extracted features 214 using the subspace representation 410 and direction $U_2$ of the extracted features 214 using the PCA. Basically, the compressed features 218 capture direction where data is best distributed in the direction $U_2$. However, with points in the corrupted features 216 (Y), direction $U_2$ deviates from the points in the extracted features 214 (X), and is different direction that minimizes distance to U1 and maximizes the distance to a distribution of the corrupted features 216.

The AI system 102 may be used in real-time or offline applications, such as video recognition, which is described next with reference to FIG. 6.

Figure 6A:
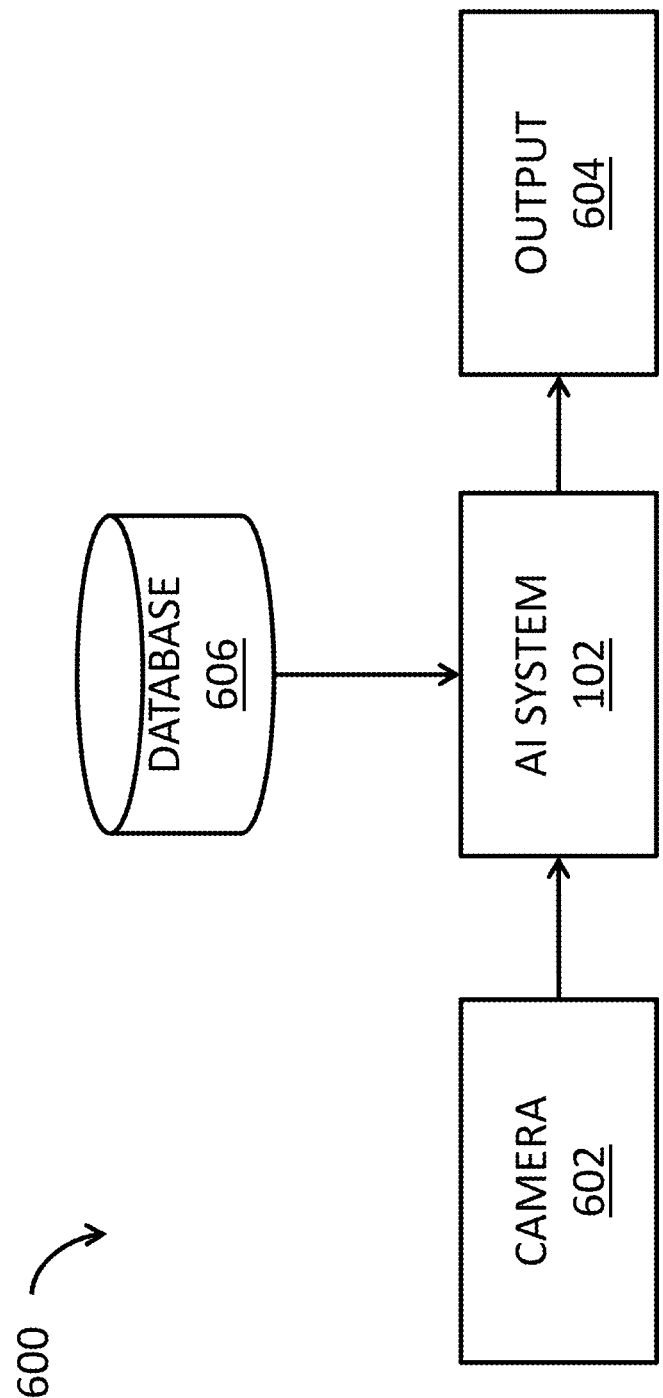
FIG. 6A shows a real-time application of the AI system, according to some example embodiments of the present disclosure.

FIG. 6A shows a real-time application 600 of the AI system 102, according to some example embodiments of the present disclosure. In one example embodiment, the real-time application 600 may include a video recognition application. In the video recognition application, a camera 602 may capture a video that is provided as input data to the AI system 102. The video may include a sequence of frames of an arbitrary length. The AI system 102 may extract features from each frame of the sequence of frames. The features extracted may correspond to an output of a frame-level deep neural network that is trained on each of the frames against their respective video label stored in a database 606. The AI system 102 may generate variation of the extracted features. The variation of the extracted features may be achieved using noise data generated by the adversarial noise generator 206 of the AI system 102.

Further, the extracted features of variations are compressed to generate a subspace representation for the video recognition. The subspace representation may be invariant to other visual information cues, due to the generated noise data and contrastive nature of the compressed features used to generate the subspace representation. The contrastive learning enables the subspace representation to data variations, which may increase accuracy of the video recognition. The AI system 102 may provide outcome of the video recognition via the output 604.

In another example embodiment, the AI system 102 may use for an image recognition from a collection of images stored in the database 606. For instance, the collection of images includes images of a person. The AI system 102 may access the images from the database 606 and extract features from the images. The extracted features are compressed using the compressor 208. The compressed features provide a subspace representation for representing an identity of the person for the image recognition. The subspace representation is stored in the database 606. Such subspace representation that is close to the extracted features of the image of the person may be used for the image recognition.

In another example embodiment, the AI system 102 may be used for video retrieval. The AI system 102 may receive a video clip from the camera 602. The video clip may include a sequence of frames of some human actions. In the database 606, a training set consisting of a preset of classes for human actions may be stored. However, the AI system 102 may not find a class that matches to the human actions in the video clip. In such case, the AI system 102 may generate noise data from features extracted from the video clip. The noise data may be combined with the extracted features to generate corrupted features. The corrupted features may be used as adversaries to contrast against a subspace representation generated by compressing extracted features of the video clip. Such subspace representation may be used for the video recognition. The recognized video may be provided via the output 604.

In another example embodiment, the real-time application 600 may include text document recognition. In the text document recognition, extracted features may be an output of a text embedding model, such as 'word2vec' model. The text embedding model may be stored in the database 606 for the document recognition. The AI system 102 may be trained to generate noise data such that each word of a document is misclassified to another word. The generated noise data may be combined with features extracted from the document to generate a set of documents variant from the original document. Further, the AI system 102 generates compressed features for the document by compressing the extracted features. The compressed features are used to generate a subspace representation for the document. The generated subspace representation is compared with from the set of documents. The subspace representation is distant from the set of documents as the set of documents vary from the original document. The subspace representation may be constructed based on grammatical order of the words in the document. Such subspace representation of the document may be used for the document recognition.

In a similar manner, the AI system 102 may be used audio applications, such as audio recognition, audio clip retrieval, or the like.

Figure 6B:
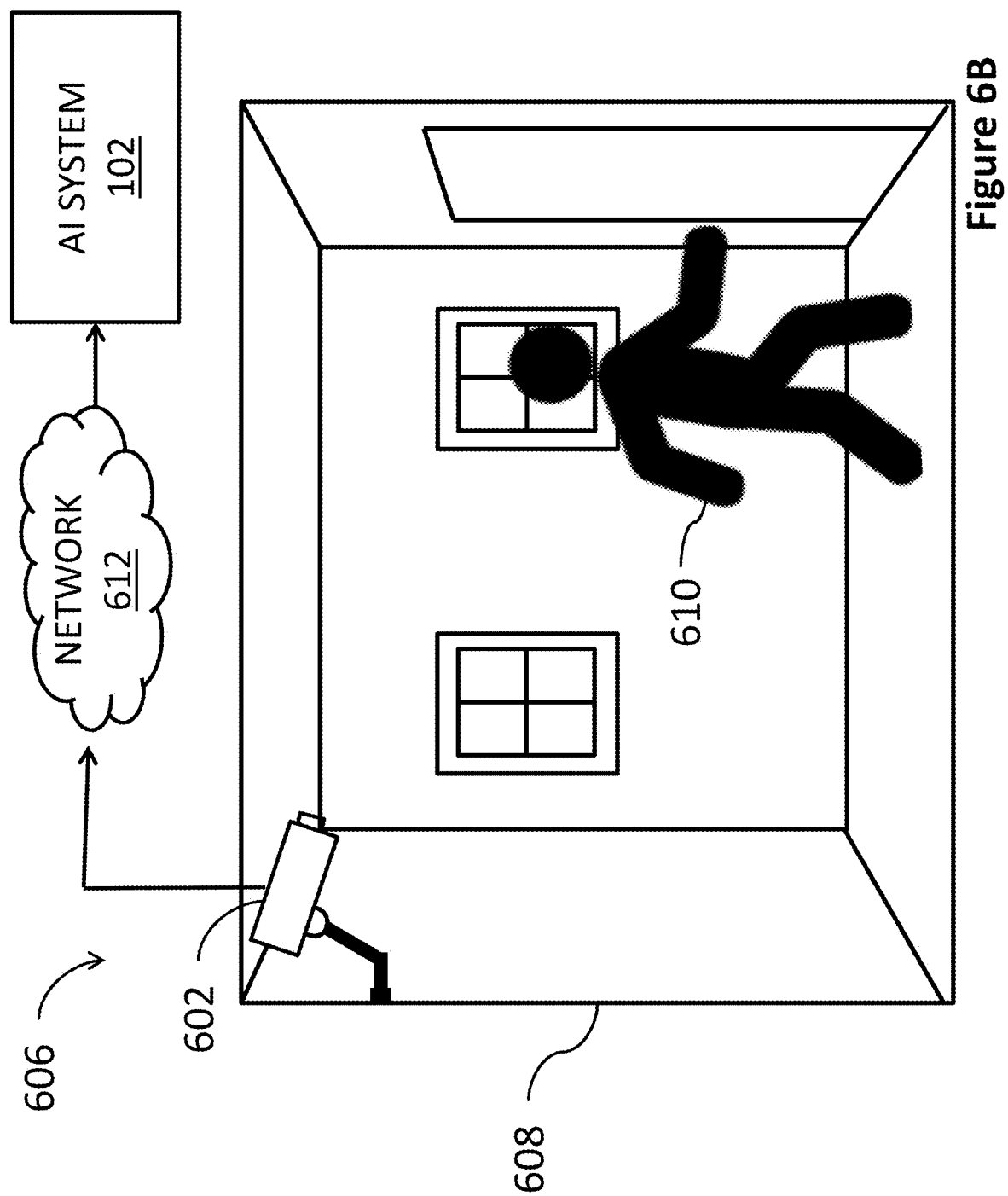
FIG. 6B shows a real-time application scenario of the AI system, according to some other example embodiments of the present disclosure.

FIG. 6B shows a real-time application scenario 606 of the AI system 102, according to some other example embodiments of the present disclosure. In an illustrative example scenario, the real-time application scenario 606 may correspond to a surveillance system of premises 608 such as an office building, a college, a residential area, and the like. The surveillance of the premises 608 is captured via the camera 602 of the surveillance system, such as a Closed-circuit television (CCTV) camera 602 as shown in FIG. 6B. For instance, in the premises 608, an object, such as a human 610 moves towards a door. The CCTV camera 602 captures a video of movement of the human 610. The captured video may be sent to the AI system 102 via a network 612. Additionally, or alternatively, the captured video may be stored in a cloud-based database, such as the database 606. The AI system 102 may access the stored video from the database 606.

Further, the AI system 102 may extract features from each frame of the video and generate variation of the extracted features using noise data. These varied extracted features are compressed to generate a subspace representation for a video recognition, such as walking action of the human 610. In some cases, identity of the human 610 may also be determined using the subspace representation. In some other cases, a few frames of the video, such as a video clip that includes the walking action may retrieve using the subspace representation. Accordingly, the surveillance of the premises 608 is performed.

Figure 7:
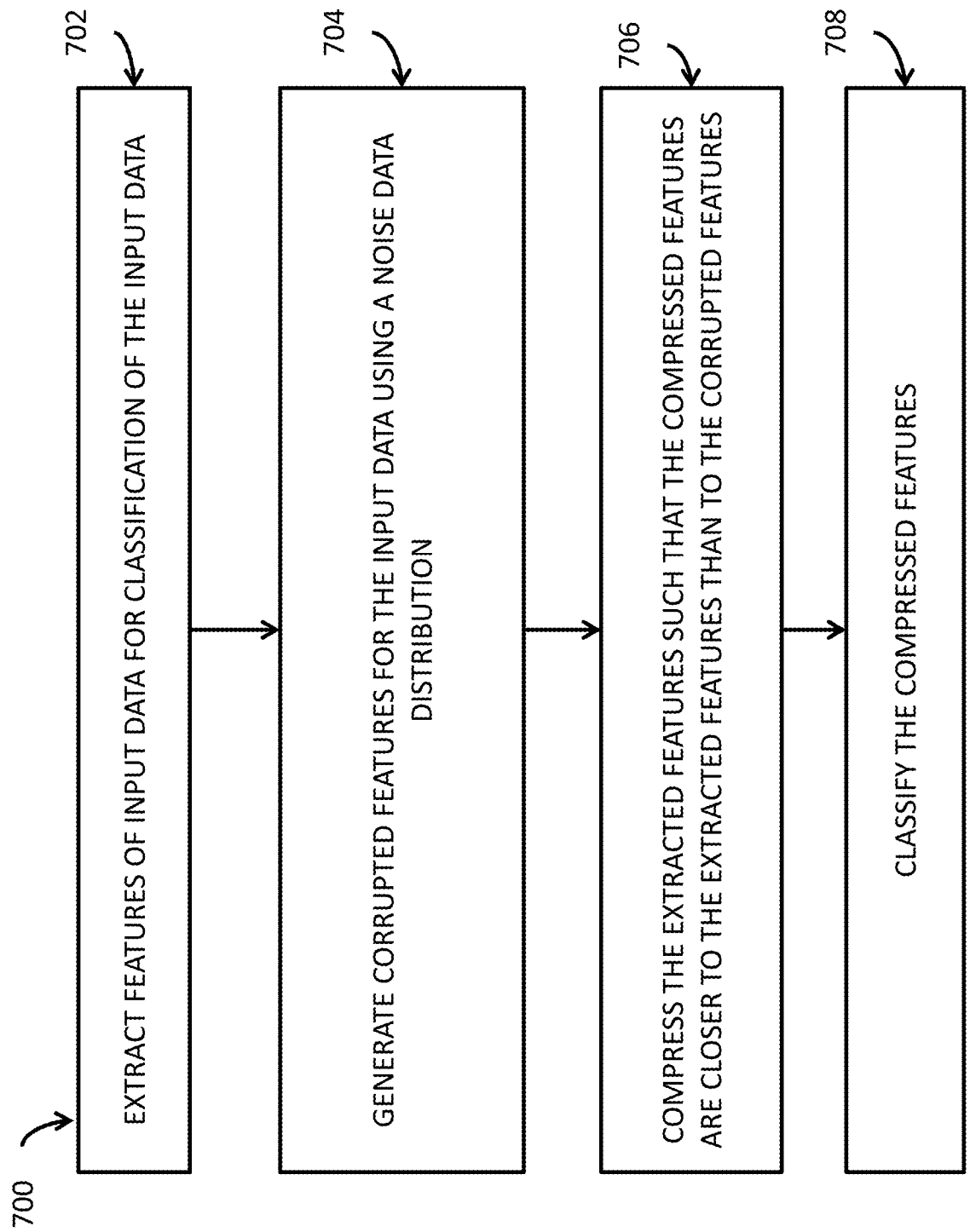
FIG. 7 shows a method flow for classification of data compressed with adversarial machine learning, according to some example embodiments of the present disclosure.

FIG. 7 shows a method flow 700 for classification of data compressed with adversarial machine learning, according to some example embodiments of the present disclosure. The method 700 is performed by the AI system 102. At operation 702, features of input data, such as the input data 104 are extracted for classification of the input data 104. The features of the input data 104 may be extracted by encoding the input data 104 into a set of feature vectors using a pre-trained neural network.

At operation 704, corrupted features are generated for the input data 104 using a noise data distribution. To that end, noise data is generated for a distribution of features 216 of the input data 104 such that corrupted features are obtained, where a misclassification rate of the corrupted features 216 that include extracted features 214 corrupted with the generated noise data is greater than the misclassification rate of the extracted features 214. The noise data is generated by adversarial noised generator (e.g. the adversarial generator 206) trained by the GAN 302. The GAN 302 comprises a generator that generates the noise data 120 and a discriminator that tests whether distribution of the corrupted features 216 matches with statistical distribution of the extracted features 216.

At operation 706, the extracted features 216 are compressed. The compressed features 218 are closer to the extracted features 214 than to the corrupted features 216. The compressed features 218 are generated by the compressor 208 of the IA system 102. The compressed features 218 may be generated by solving a multi-objective optimization optimizing a cost function. The cost function reduces a distance between the compressed features and the extracted features 214. The cost function also increases a distance between the compressed features 218 and the corrupted features 216. In some embodiments, the compressed features 218 may also undergo a minimization process through a loss function. The loss function includes a combination of failures of the generated distribution and failures of the classification. In some embodiments, the compressed features 218 may be projected into a subspace to generate a subspace representation of a sequence of temporally connected data of the input data. The sequence of temporally connected data may be determined based on a temporal order of the input data 104. The temporal order may be determined using PCA technique. The subspace representation is prevented from diverging from the input data 104 based on a distortion penalty.

At operation 708, the compressed features 218 are classified. The compressed features 218 are filtered from the noise data and are close to the extracted features 214. In an example embodiment, the classified compressed features 218 may be classified to a class that is close to the input data 104.

Figure 8:
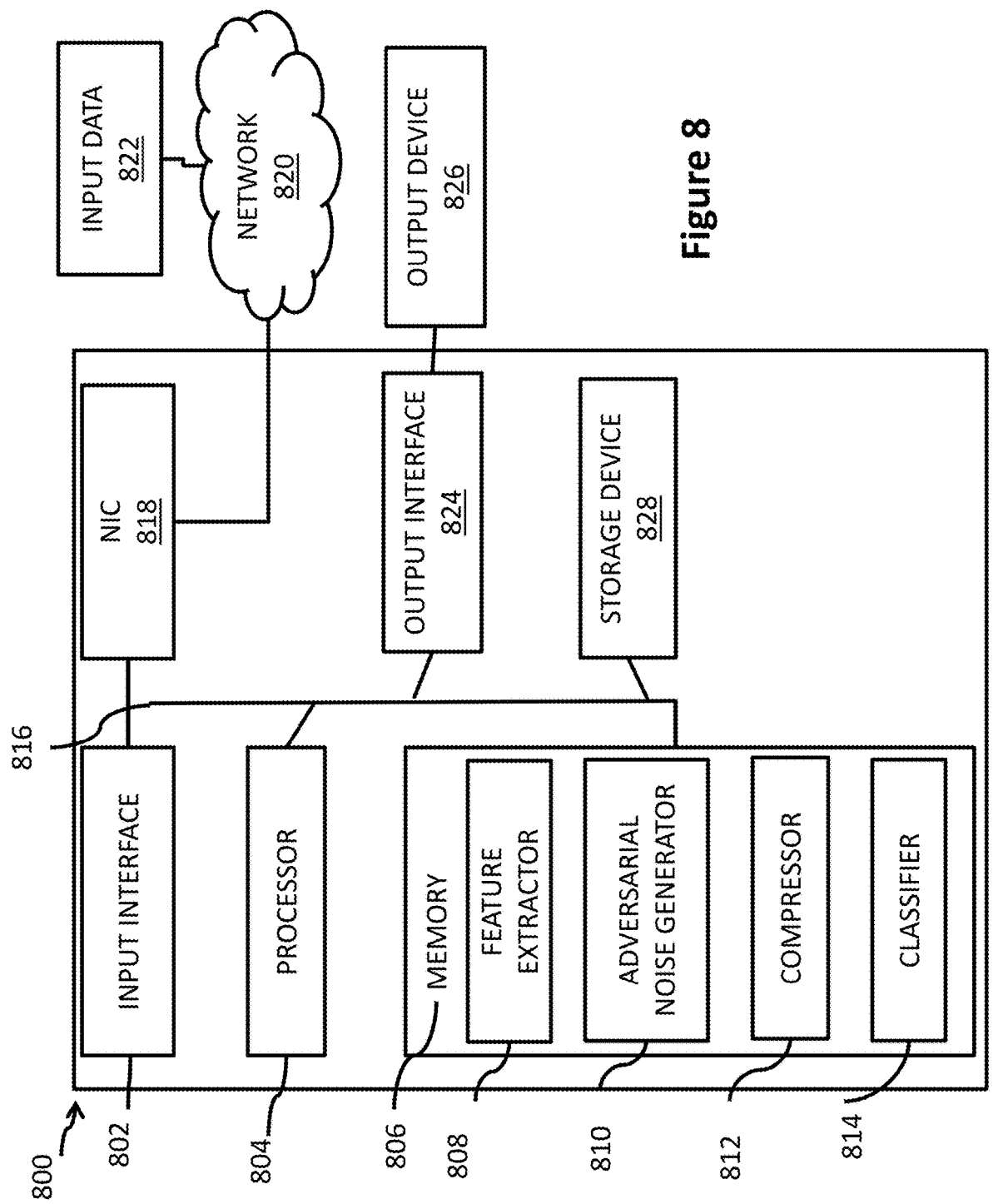
FIG. 8 shows an overall block diagram of the AI system, according to some example embodiments of the present disclosure.

FIG. 8 shows an overall block diagram of the AI system 800, according to some example embodiments of the present disclosure.

The AI system 800 corresponds to the AI system 102 of FIG. 1. The AI system 800 includes a processor 804 configured to execute stored instructions, as well as a memory 806 that stores instructions that are executable by the processor 804. The processor 804 corresponds to the processor 200. The processor 804 can be a single core processor, a multi-core processor, a computing cluster, or any number of other configurations. The memory 806 can include random access memory (RAM), read only memory (ROM), flash memory, or any other suitable memory systems. The processor 804 is connected through a bus 816 to an input interface 802. These instructions implement a method 700 for classification of compressed features, such as the compressed features 218.

In some implementations, the AI system 800 may have different types and combination of input interfaces to receive input data 822. In one implementation, the input interface 802 may include a keyboard and/or pointing device, such as a mouse, trackball, touchpad, joy stick, pointing stick, stylus, or touchscreen, among others.

Additionally, or alternatively, a network interface controller 816 may be adapted to connect the AI system 800 through the bus 816 to a network 826. Through the network 826, the input data 822 may be downloaded and stored within the memory 806 for storage and/or further processing.

In some embodiments, the memory 806 is configured to store modules, such as a feature extractor 808, an adversarial noise generator 810, a compressor 812 and a classifier 814. The modules are executed by the processor 804 for classification of the compressed features. The feature extractor 808 may be trained to process the input data 822 to extract features of the input data 822 for classification of the input data 822. The adversarial noise generator 810 is trained to generate noise data for distribution of features of the input data 822. The generated noise data are coupled with the extracted features to generated corrupted features. The noise data is generated such that a misclassification rate of the corrupted features is greater than a misclassification rate of the extracted features. The compressor 812 is configured to compress the extracted features. The compressed features are closer to the extracted features than the corrupted features. The classifier is trained to classify the compressed features.

Additionally, or alternatively, a set of ground truth label classes for the classification of the input data 822 may be stored in a storage device 828.

In addition to input interface 802, the AI system 800 may include one or multiple output interfaces to output the classified compressed features. For example, the AI system 800 may be linked through the bus 816 to an output interface 824 adapted to connect the AI system 800 to an output device 826, wherein the output device 826 may include a computer monitor, projector, a display device, a screen, mobile device.

In this manner, the AI system 800 generates compressed feature data that may be used as a subspace representation. The subspace representation is of low-dimension that may be used for classification of input data, in an efficient manner. The subspace representation is filtered from any randomly generated noise data that may help in generating accurate output of the classification. The subspace representation may be generated different modalities of the input data. The different modalities may include image data, video data, audio data, textual data or the like. This provides flexibility and versatility in usage of the AI system 800.

The above-described embodiments of the present disclosure may be implemented in any of numerous ways. For example, the embodiments may be implemented using hardware, software or a combination thereof. When implemented in software, the software code may be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Therefore, it is the object of the appended claims to cover all such variations and modifications as come within the true spirit and scope of the present disclosure.

The invention claimed is:

1. An artificial intelligence (AI) system for classification of data including a processor configured to execute modules of the AI system, the modules comprising:
   a feature extractor trained with machine learning to process input data to extract features of the input data for classification of the input data;
   an adversarial noise generator trained with machine learning such that the adversarial noise generator is configured to generate noise data for distribution of features of the input data, wherein a misclassification rate of corrupted features that include extracted features corrupted with the generated noise data is caused by the training of the adversarial noise generator to be greater than a misclassification rate of the extracted features;
   a compressor configured to compress the extracted features, wherein the compressed features are closer to the extracted features than to the corrupted features; and
   a classifier trained with machine learning to classify the compressed features.

2. The AI system of claim 1,
   wherein the compressor is further configured to determine the compressed features by solving a multi-objective optimization optimizing a cost function,
   wherein the cost function reduces a distance between the compressed features and the extracted features, and
   wherein the cost function increases a distance between the compressed features and the corrupted features.

3. The AI system of claim 1, wherein the adversarial noise generator is trained using a Generative Adversarial Network (GAN).

4. The AI system of claim 3, wherein the GAN includes:
   a generator configured to generate the noise data from statistical distribution of the extracted features,
   wherein a success rate of classification of the corrupted features is less than a success rate of classification of the extracted features; and
   a discriminator configured to test whether distribution of the corrupted features matches with the statistical distribution of the extracted features.

5. The AI system of claim 4, wherein the compressor is trained to minimize a loss function including a combination of failures of the generated distribution of the corrupted features and failures of the classification.

6. The AI system of claim 4, wherein the generator is further configured to:
   replicate the extracted features; and
   generate corrupted features for each replicated feature of the extracted features by combining the noise data with each replicated feature.

7. The AI system of claim 2, wherein the compressor is configured to learn a temporal order of the input data.

8. The AI system of claim 7, wherein the compressor is further configured to project the compressed features into a subspace to generate a subspace representation of a sequence of temporally connected data of the input data, and wherein the sequence of temporally connected data is based on the temporal order.

9. The AI system of claim 8, wherein the compressor is further configured to prevent the subspace representation, from diverging from the input data, based on a distortion penalty.

10. The AI system of claim 1, wherein the processor is further configured to receive the input data from a camera of a surveillance system.

11. The AI system of claim 1, wherein the input data comprises one or a combination of audio data, image data, video data, and/or textual data.

12. A computer-implemented method for classification of data, wherein the method uses a processor coupled with stored instructions implementing the method, wherein the instructions when executed by the processor carry out steps of the method, the method comprising:
   extracting features of input data for classification of the input data using a feature extractor trained with machine learning;
   generating noise data for distribution of features of the input data using an adversarial noise generator trained with machine learning such that the adversarial noise generator is configured to generate the noise data such that a misclassification rate of corrupted features that include extracted features corrupted with the generated noise data is caused by the training of the adversarial noise generator to be greater than a misclassification rate of the extracted features;

compressing the extracted features using a compressor such that the compressed features are closer to the extracted features than to the corrupted features; and classifying the compressed features using a classifier trained with machine learning.

13. The computer-implemented method of claim 12, wherein the compression of the extracted features comprises solving a multi-objective optimization optimizing a cost function, wherein the cost function reduces a distance between the compressed features and the extracted features, and wherein the cost function increases a distance between the compressed features and the corrupted features.

14. The computer-implemented method of claim 12, wherein the noise data is generated by a Generative Adversarial Network (GAN).

15. The computer-implemented method of claim 14, further comprising:

generating the noise data from statistical distribution of the extracted features, wherein a success of classification of the corrupted features is less than a success rate of classification of the extracted features; and testing whether distribution of the corrupted features matches with the statistical distribution of the extracted features.

16. The computer-implemented method of claim 14, further comprising:

minimizing a loss function including a combination of failures of the generated distribution and failures of the classification.

17. The computer-implemented method of claim 14, further comprising:

replicating the extracted features;

combining the noise data with each replicated feature of the extracted features; and generating corrupted features for each replicated feature of the extracted features based on the combination.

18. The computer-implemented method of claim 13, further comprising:

learning a temporal order of the input data.

19. The computer-implemented method of claim 18, further comprising:

projecting the compressed features into a subspace to generate a subspace representation of a sequence of temporally connected data of the input data, wherein the sequence of temporally connected data is based on the temporal order.

20. The computer-implemented method of claim 19, further comprising:

preventing the subspace representation from diverging from the input data based on a distortion penalty.

* * * * *